(12) United States Patent
Liu et al.

(10) Patent No.: US 7,233,290 B2
(45) Date of Patent: Jun. 19, 2007

(54) ANTENNA AND NOTEBOOK UTILIZING THE SAME

(75) Inventors: Chih-Kai Liu, Taipei (TW); Wei-Li Cheng, Taipei Hsien (TW)

(73) Assignee: Wistron NeWeb Corp., Taipei Hsien (TW)

( * ) Notice: Subject to any disclaimer, the term of this patent is extended or adjusted under 35 U.S.C. 154(b) by 48 days.

(21) Appl. No.: 11/233,781

(22) Filed: Sep. 23, 2005

(65) Prior Publication Data

US 2007/0013587 A1 Jan. 18, 2007

(30) Foreign Application Priority Data

Jul. 14, 2005 (TW) .............................. 94123889 A

(51) Int. Cl.
*H01Q 1/38* (2006.01)
(52) U.S. Cl. .............................. 343/700 MS; 343/895; 343/702
(58) Field of Classification Search ......... 343/700 MS, 343/702, 895, 846, 795
See application file for complete search history.

(56) References Cited

U.S. PATENT DOCUMENTS

| | | | |
|---|---|---|---|
| 5,926,139 A * | 7/1999 | Korisch ....................... 343/702 |
| 6,459,413 B1 * | 10/2002 | Tseng et al. ................. 343/702 |
| 6,476,769 B1 * | 11/2002 | Lehtola ....................... 343/702 |
| 6,864,854 B2 * | 3/2005 | Dai et al. ................... 343/846 |
| 6,995,717 B2 * | 2/2006 | Ryu ............................. 343/702 |
| 7,113,135 B2 * | 9/2006 | Jo et al. ...................... 343/702 |
| 2002/0175866 A1 * | 11/2002 | Gram ........................... 343/702 |
| 2004/0130493 A1 * | 7/2004 | Horita et al. ................ 343/702 |
| 2005/0259031 A1 * | 11/2005 | Sanz et al. .................. 343/895 |
| 2006/0049994 A1 * | 3/2006 | Ide .............................. 343/702 |

* cited by examiner

*Primary Examiner*—Tan Ho
(74) *Attorney, Agent, or Firm*—Quintero Law Office

(57) ABSTRACT

An antenna comprises a ground element, a conductive element, a signal line, a first transmitting element, a second transmitting element. The conductive element is L-shaped and connected to the ground element. The signal line is coupled to the conductive element. The first transmitting element is connected to the conductive element for transmitting a first signal. The second transmitting element is connected to the conductive element for transmitting a second signal. The first signal is a GSM900 signal and the second signal is a DCS1800 signal.

18 Claims, 8 Drawing Sheets

ANTENNA AND NOTEBOOK UTILIZING THE SAME

BACKGROUND

The invention relates to an antenna, and more particularly to an antenna utilized in a notebook.

GSM 900 and DCS 1800 signals are widely utilized in cell phone communication for transmitting audio and visual data. FIG. 1a shows a conventional flat antenna 1 for transmitting GSM 900 and DCS 1800 signals, disposed in a cell phone, comprising a radiator 2 and a signal line 3. The signal line 3 is coupled to the radiator 2. With reference to FIG. 1b, when the flat antenna 1 transmits GSM 900 signal, a bandwidth thereof (bandwidth is defined as signals having voltage standing wave ratios lower than 4) is about 70 to 80 MHz, and when the flat antenna 1 transmits DCS 1800 signal, a bandwidth thereof is about 140 to 150 MHz.

Wireless communication, particularly long distance wireless transmission and wideband transmission, has become a necessary feature for notebooks. A notebook can provide long distance wireless transmission via insertion of a conventional flat antenna 1 therein. However, flat antenna 1 has a narrower bandwidth and lower transmission speed, and cannot satisfy wideband transmission requirements.

SUMMARY

An embodiment of an antenna comprises a ground element, a conductive element, a signal line, a first transmitting element, a second transmitting element. The conductive element is L-shaped and connected to the ground element. The signal line is coupled to the conductive element. The first transmitting element is connected to the conductive element for transmitting a first signal. The second transmitting element is connected to the conductive element for transmitting a second signal. The first signal is a GSM900 signal and the second signal is a DCS1800 signal.

When the antenna of the invention transmits a GSM 900 signal, the bandwidth is increased to 150 MHz. When the antenna of the invention transmits a DCS 1800 signal, the bandwidth is increased to 500 MHz. Thus, the invention can effectively increase the bandwidth when it transmits GSM 900 and DCS 1800 signals.

DESCRIPTION OF THE DRAWINGS

The invention will be more fully understood from the following detailed description and the accompanying drawings, given by the way of illustration only and thus not intended to limit the invention.

DETAILED DESCRIPTION

First Embodiment

Figure 1A:
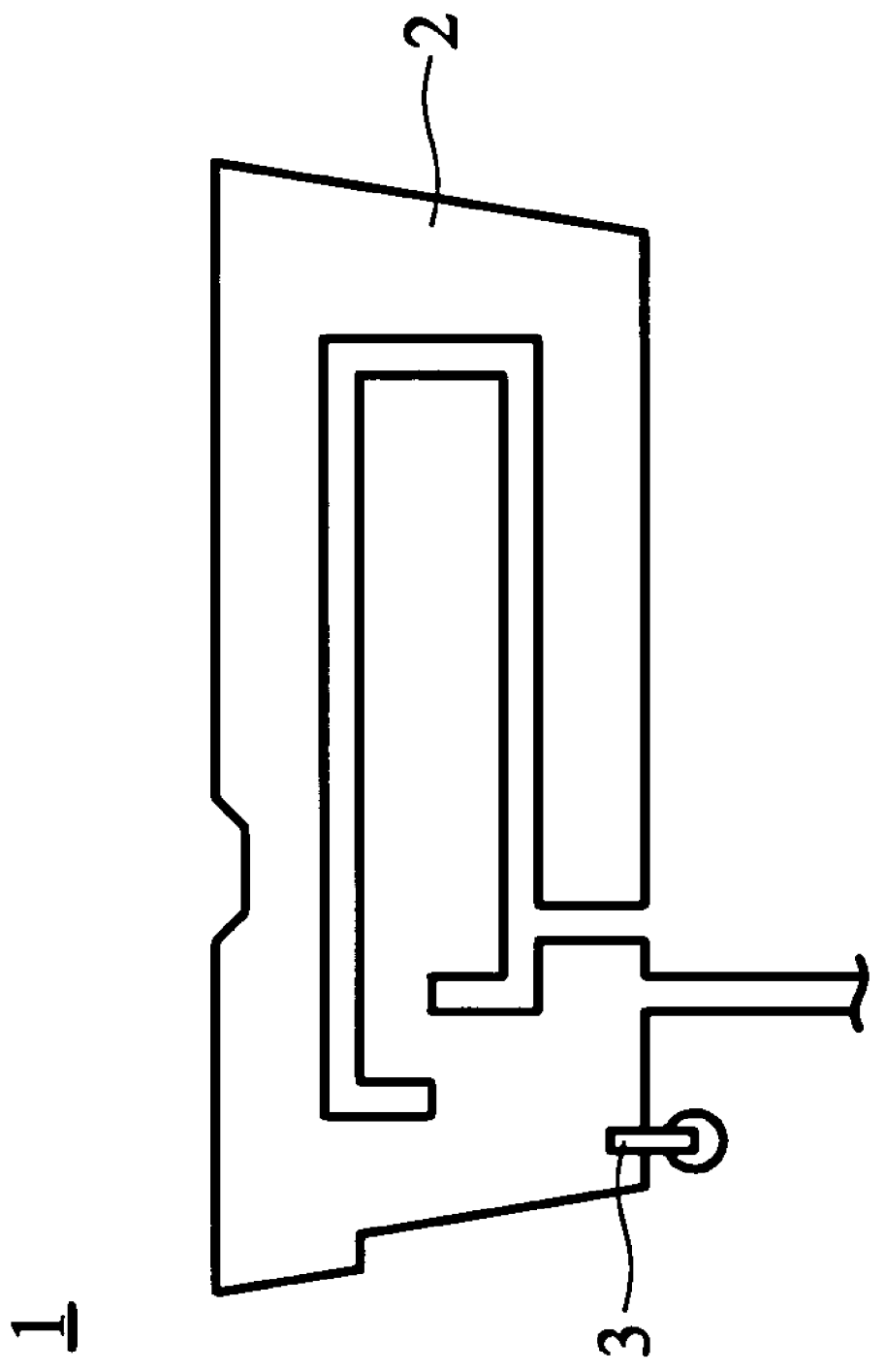
FIG. 1a shows a conventional flat antenna.
Figure 1B:
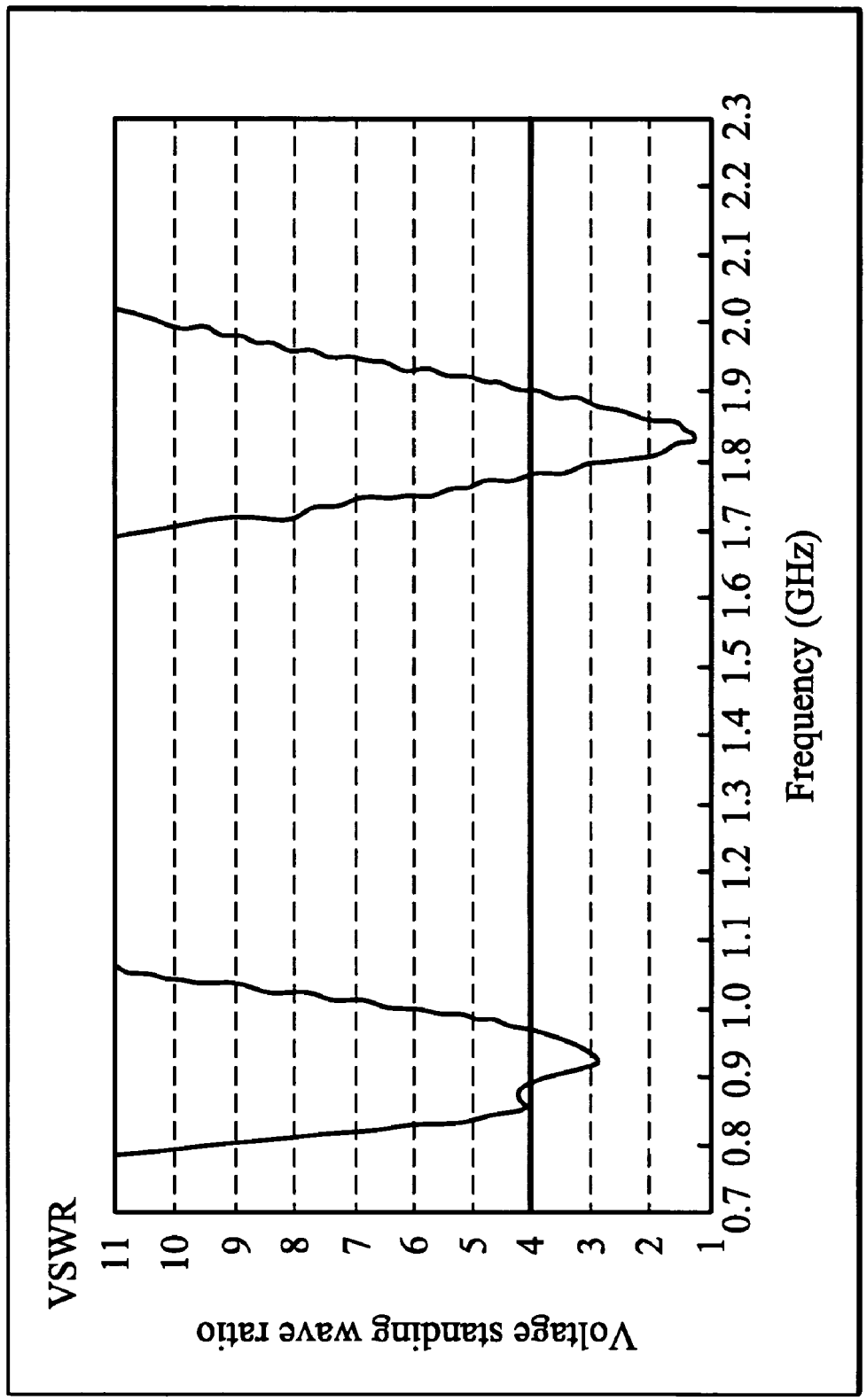
FIG. 1b shows the signal transmission effect of the conventional flat antenna.
Figure 2A:
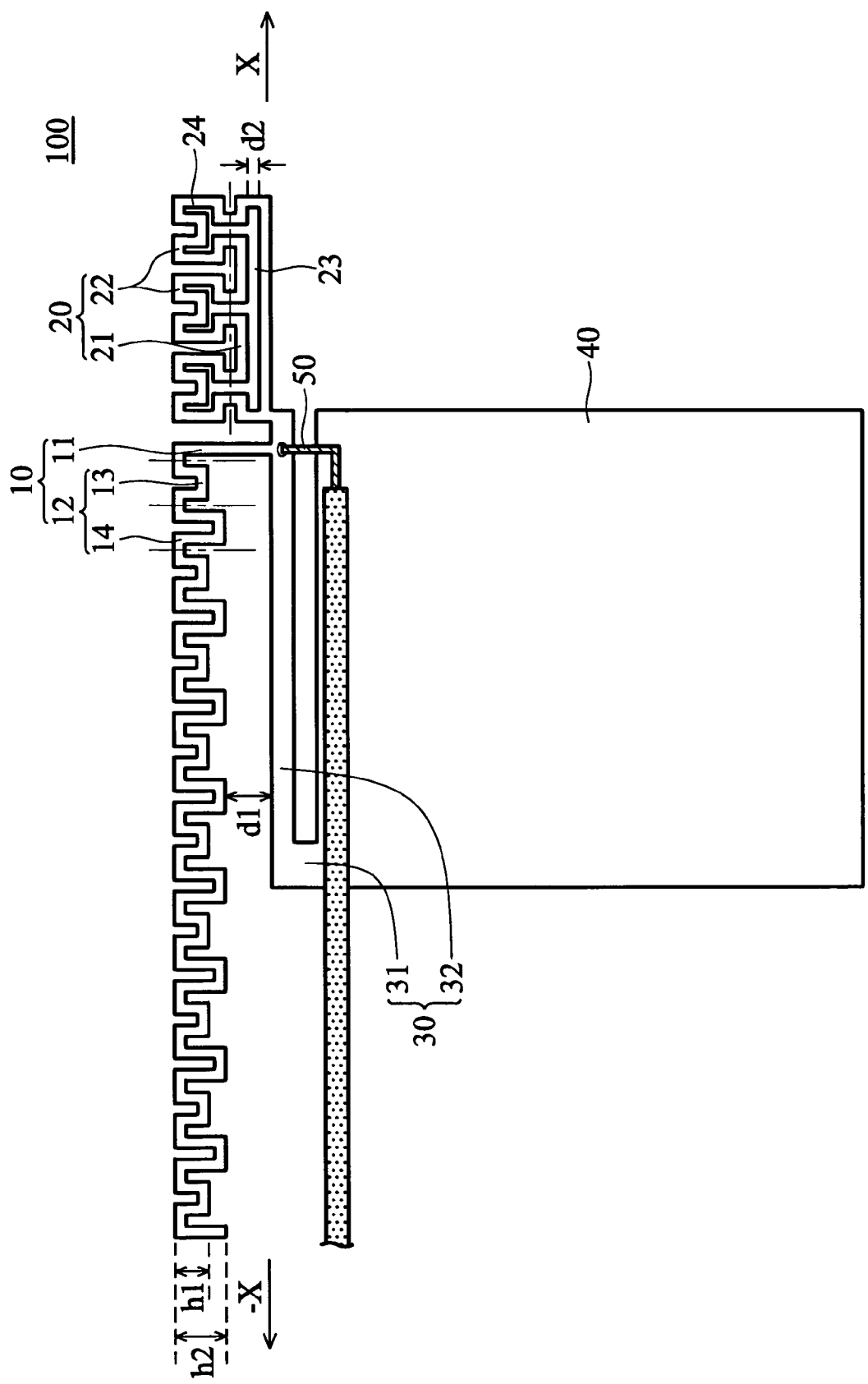
FIG. 2a shows an antenna of a first embodiment of the invention.

FIG. 2a shows an antenna 100 of a first embodiment of the invention, which comprises a first transmitting element 10, a second transmitting element 20, a conductive element 30, a ground element 40 and a signal line 50. The conductive element 30 is connected to the ground element 40. The signal line 50 is coupled to the conductive element 30. The first transmitting element 10 is connected to the conductive element 30 for transmitting a first signal (GSM 900 signal). The second transmitting element 20 is connected to the conductive element 30 for transmitting a second signal (DCS 1800 signal).

The conductive element 30 is L-shaped, and comprises a first arm 31 and a second arm 32. The first arm 31 is connected to the ground element 40. The second arm 32 is connected to the first arm 31 and extends in a first direction x. The signal line 50 is coupled to the second arm 32.

The first transmitting element 10 is substantially L-shaped, and comprises a first portion 11 and a second portion 12. The first portion 11 is connected to the second arm 32. The second portion 12 is connected to the first portion 11. The second portion 12 comprises a plurality of first U-shaped structures 13 and a plurality of second U-shaped structures 14. The height h2 of the second U-shaped structures 14 is higher than the height h1 of the first U-shaped structures 13. The first U-shaped structures 13 and the second U-shaped structures 14 are interlaced and aligned in a second direction -x. The second direction -x is opposite to the first direction x. A first gap d1 is formed between the second portion 12 and the second arm 32. The signal transmission effect (for example, bandwidth) of the first signal is modified by altering the gap d1.

The second transmitting element 20 is a fractal patch antenna and connected to the second arm 32. The second transmitting element 20 comprises a third portion 21 and a fourth portion 22. The third portion 21 is longitudinal and extends in the first direction x. The fourth portion 22 comprises a plurality of chalice-shaped structures which are connected to each other and aligned in the first direction x. The fourth portion 22 is connected to the third portion 21. The third portion 21 comprises a first slot 23. The fourth portion 22 comprises second slots 24. The first slot 23 is longitudinal and extends in the first direction x. The signal transmission effect (for example, bandwidth) of the second signal is modified by altering the width d2 of the first slot 23. The second slots 24 are chalice-shaped and connected to the first slot 23.

Figure 2B:
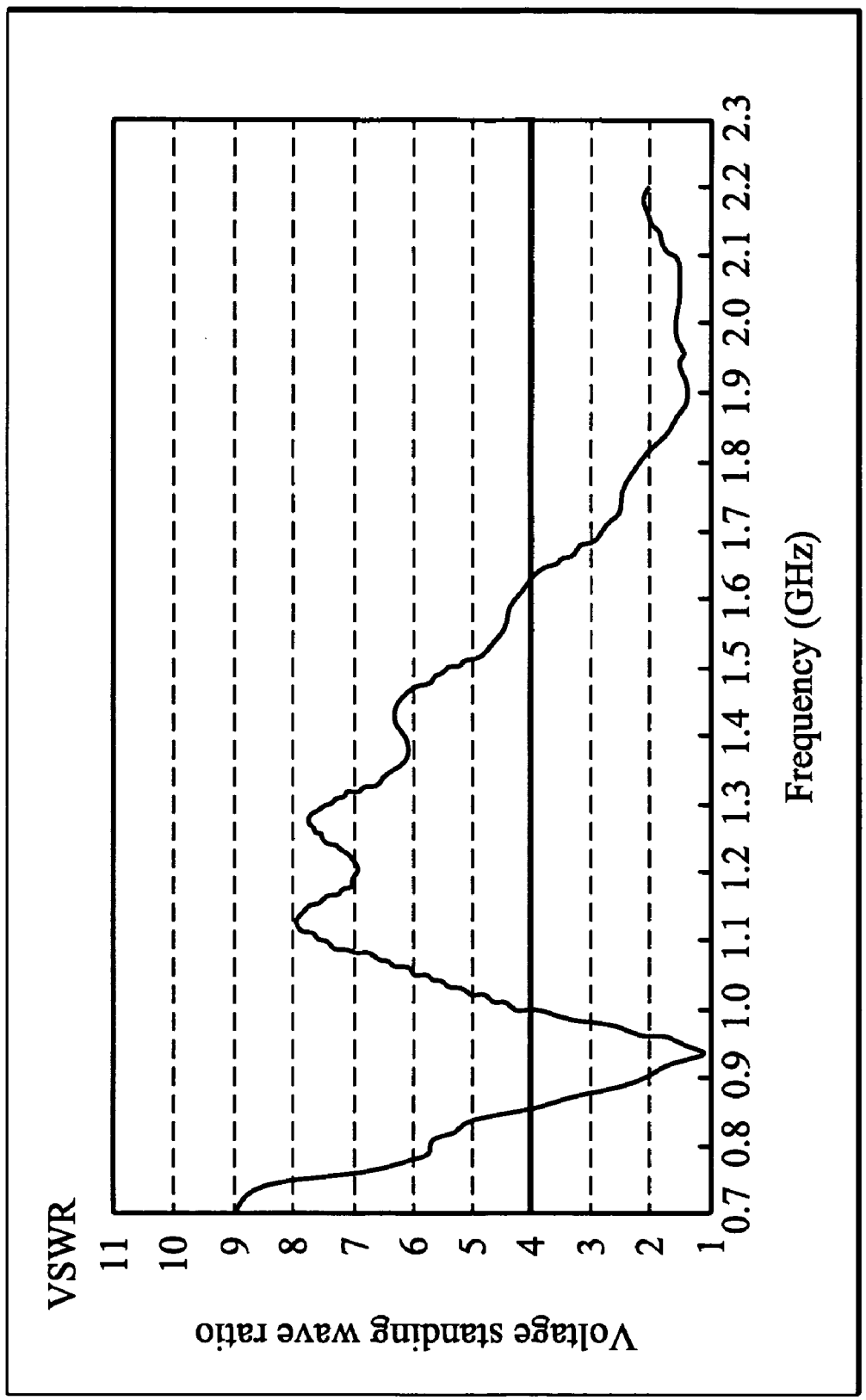
FIG. 2b shows the signal transmission effect of the antenna of the first embodiment.

With reference to FIG. 2b, when the antenna 100 transmits a GSM 900 signal, the bandwidth thereof is increased to 150 MHz. When the antenna 100 transmits DCS 1800 signal, the bandwidth thereof is increased to 500 MHz. Thus, the invention increases the bandwidth when transmits GSM 900 and DCS 1800 signals.

Figure 2C:
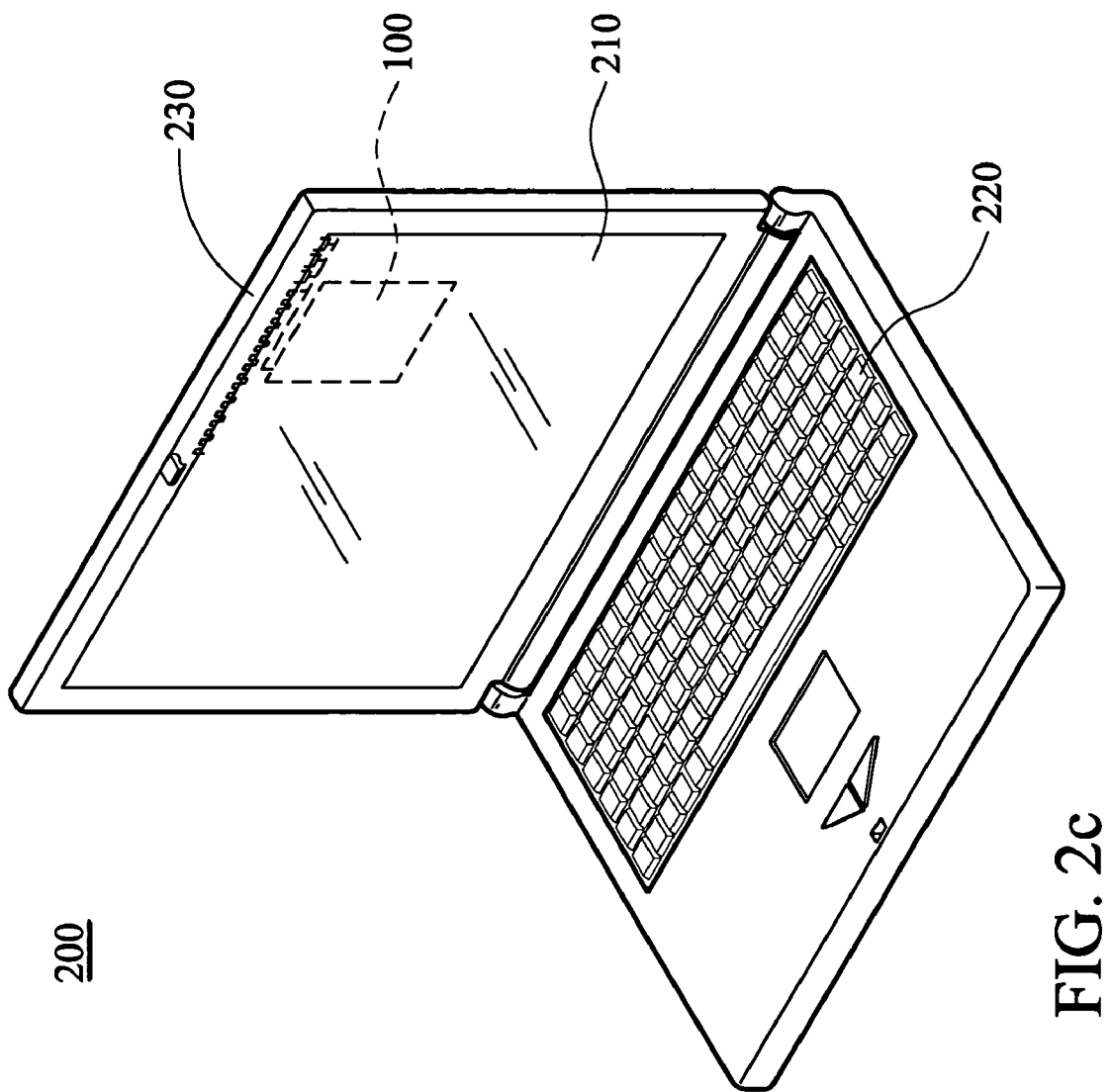
FIG. 2c shows the antenna of the first embodiment utilized in a notebook.

With reference to FIG. 2c, the antenna 100 can be disposed in a notebook 200. The notebook 200 comprises a screen 210, a control interface 220 and a housing 230. The antenna 100 is disposed in the housing 230. The notebook 200 transmits the GSM 900 and DCS 1800 signals through the antenna 100 of the invention.

Second Embodiment

Figure 3:
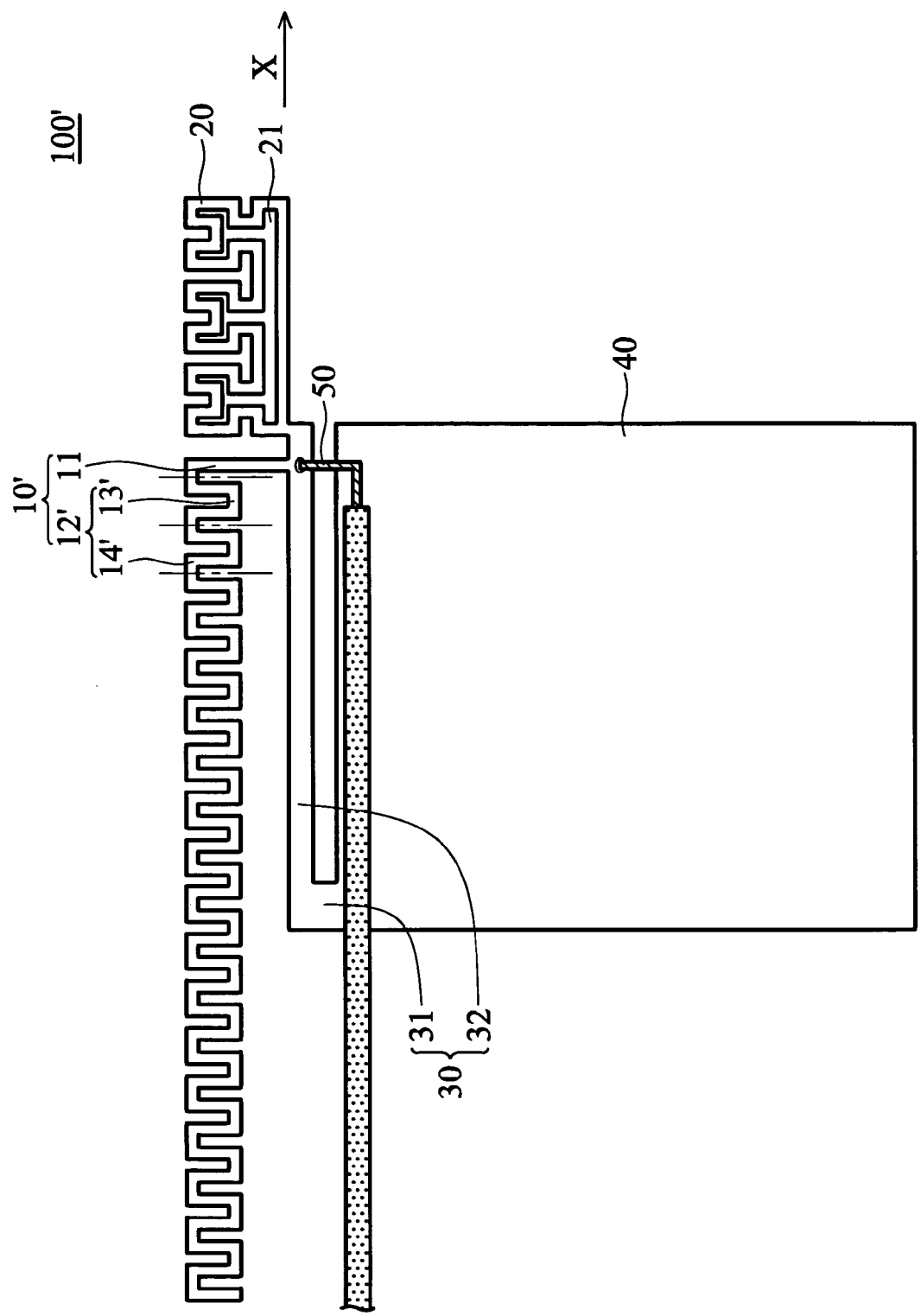
FIG. 3 shows an antenna of a second embodiment of the invention.

FIG. 3 shows an antenna 100' of a second embodiment of the invention, wherein the heights of the first U-shaped structures and the second U-shaped structures are the same. The U-shaped structure can also be replaced by other waved-structures, for example, an isosceles triangle with no base. The pattern of the second transmitting element 20 (fractal patch antenna) can be altered to modify the signal transmission effect, or to transmit signals other than the GSM 900 and DCS 1800 signals.

Third Embodiment

Figure 4:
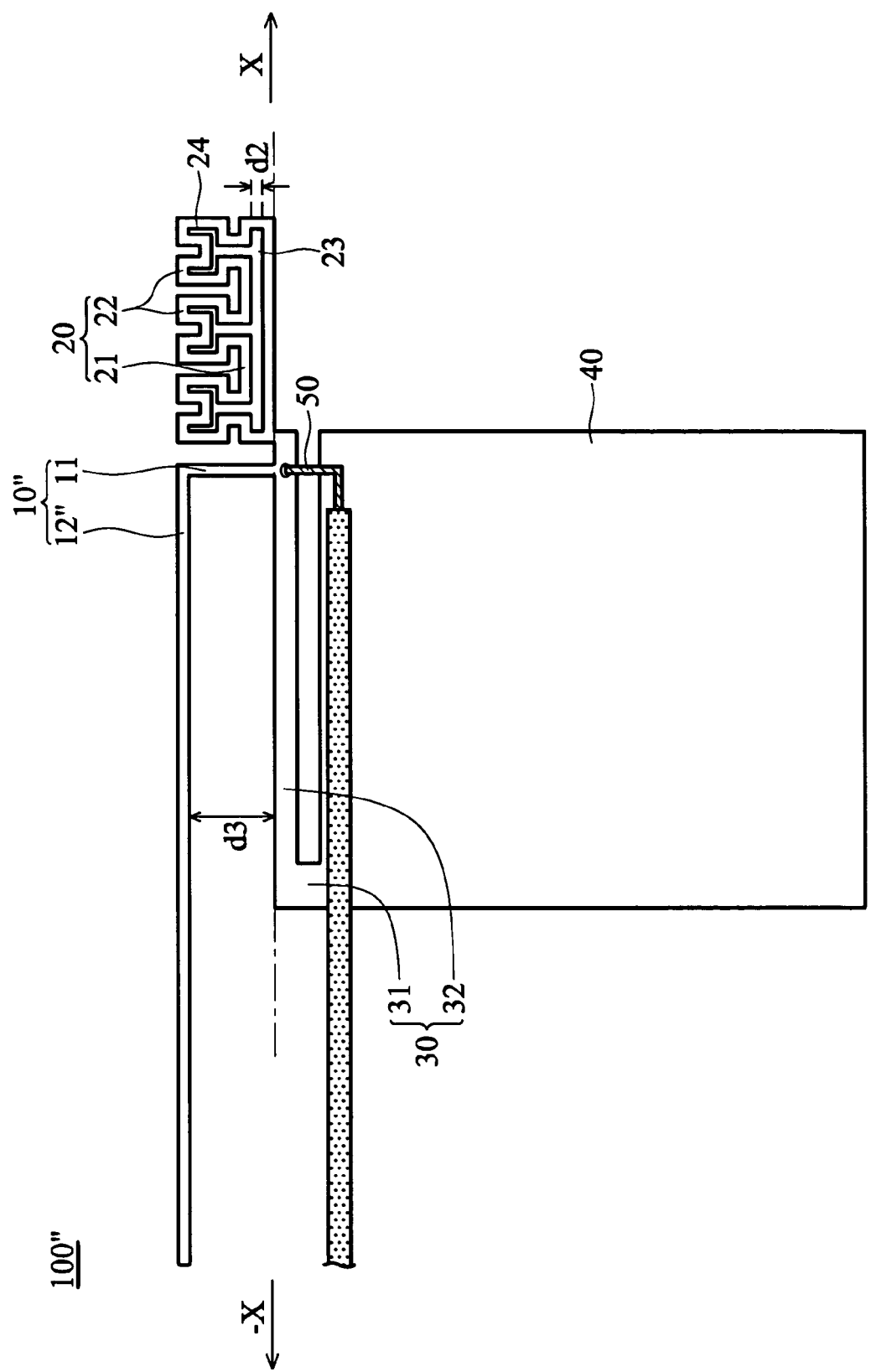
FIG. 4 shows an antenna of a third embodiment of the invention.

FIG. 4 shows an antenna 100″ of a third embodiment of the invention, wherein the second portion 12″ of the first transmitting element 10″ is longitudinal and extends in the second direction −x. A gap d3 is formed between the second portion 12″ and the second arm 32. The signal transmission effect (for example, bandwidth) of the first signal is modified by altering the gap d3.

Fourth Embodiment

Figure 5:
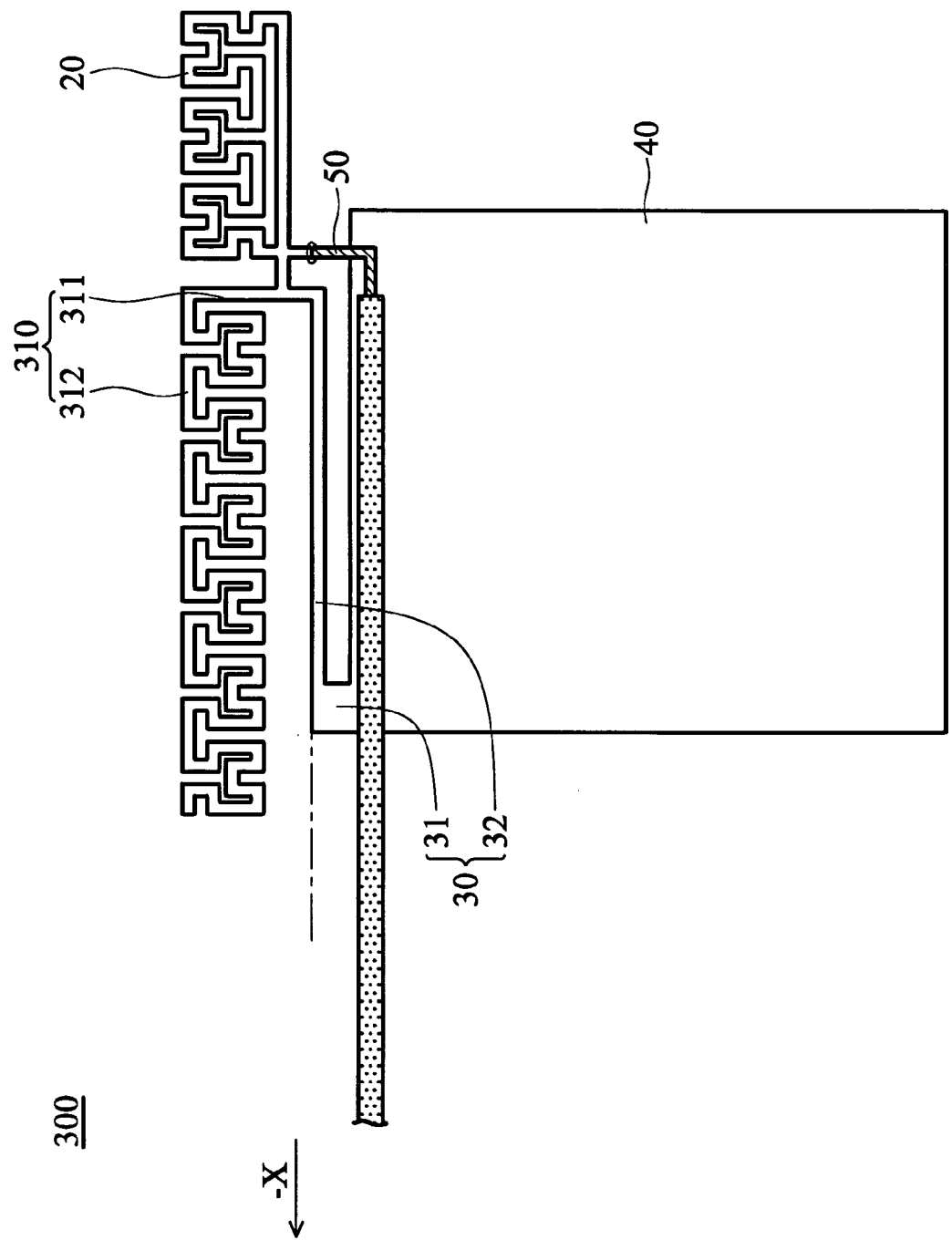
FIG. 5 shows an antenna of a fourth embodiment of the invention.

FIG. 5 shows an antenna 300 of a fourth embodiment of the invention. A first transmitting element 310 of the antenna 300 comprises a first portion 311 and a second portion 312. The antenna 300 is exceptional in that the second portion 312 is a fractal patch antenna for minimizing the antenna.

While the invention has been described by way of example and in terms of few embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An antenna, comprising:
   a ground element;
   a conductive element, which is L-shaped and connected to the ground element, wherein the conductive element comprises a first arm and a second arm, the first arm is connected to the ground element, and the second arm is connected to the first arm and extending in a first direction;
   a signal line, coupled to the conductive element;
   a first transmitting element, connected to the conductive element for transmitting a first signal, wherein the first transmitting element comprises a first portion and a second portion, the first portion is connected to the second arm, the second portion is connected to the first portion and extends in a second direction, the second direction is opposite to the first direction, and the second portion comprises at least one U-shaped structure; and
   a second transmitting element, connected to the conductive element for transmitting a second signal, wherein the first signal is a GSM900 signal and the second signal is a DCS1800 signal.

2. The antenna as claimed in claim 1, wherein the signal line is coupled to the second arm.

3. The antenna as claimed in claim 1, wherein the second portion comprises a plurality of U-shaped structures, and the U-shaped structures are connected to each other and aligned in the second direction.

4. The antenna as claimed in claim 1, wherein the second portion comprises at least one first U-shaped structure and at least one second U-shaped structure, the second U-shaped structure is higher than the first U-shaped structure, and the first U-shaped structure is connected to the second U-shaped structure.

5. The antenna as claimed in claim 1, wherein the second portion comprises a plurality of first U-shaped structures and a plurality of second U-shaped structures, the second U-shaped structures are higher than the first U-shaped structures, and the first U-shaped structures and the second U-shaped structures are interlaced and aligned in the second direction.

6. The antenna as claimed in claim 1, wherein a gap is formed between the second portion and the second arm, and a bandwidth of the first signal is modified by altering a width of the gap.

7. An antenna, comprising:
   a ground element;
   a conductive element, which is L-shaped and connected to the ground element, wherein the conductive element comprises a first arm and a second arm, the first arm is connected to the ground element, and the second arm is connected to the first arm and extending in a first direction;
   a signal line, coupled to the conductive element;
   a first transmitting element, connected to the conductive element for transmitting a first signal; and
   a second transmitting element, connected to the conductive element for transmitting a second signal, wherein the first signal is a GSM900 signal, the second signal is a DCS1800 signal, and the second transmitting element is a fractal antenna connected to the second arm.

8. The antenna as claimed in claim 7, wherein the second transmitting element comprises a first slot extending in the first direction.

9. A notebook, comprising:
   a housing; and
   an antenna, disposed in the housing and comprising:
      a ground element;
      a conductive element, which is L-shaped and connected to the ground element, wherein the conductive element comprises a first arm and a second arm, the first arm is connected to the ground element, and the second arm is connected to the first arm and extending in a first direction;
      a signal line, coupled to the conductive element;
      a first transmitting element, connected to the conductive element for transmitting a first signal, wherein the first transmitting element comprises a first portion and a second portion, the first portion is connected to the second arm, the second portion is connected to the first portion and extends in a second direction, the second direction is opposite to the first direction, and the second portion comprises at least one U-shaped structure; and
      a second transmitting element, connected to the conductive element for transmitting a second signal,
      wherein the first signal is a GSM900 signal and the second signal is a DCS1800 signal.

10. The notebook as claimed in claim 9, wherein the signal line is coupled to the second arm.

11. The notebook as claimed in claim 9, wherein the second portion comprises a plurality of U-shaped structures, and the U-shaped structures are connected to each other and aligned in the second direction.

12. The notebook as claimed in claim 9, wherein the second portion comprises at least one first U-shaped structure and at least one second U-shaped structure, the second U-shaped structure is higher than the first U-shaped structure, and the first U-shaped structure is connected to the second U-shaped structure.

13. The notebook as claimed in claim 9, wherein the second portion comprises a plurality of first U-shaped structures and a plurality of second U-shaped structures, the second U-shaped structures are higher than the first U-shaped structures, and the first U-shaped structures and the second U-shaped structures are interlaced and aligned in the second direction.

14. The notebook as claimed in claim 9, wherein a gap is formed between the second portion and the second arm, and a bandwidth of the first signal is modified by altering a width of the gap.

15. A notebook, comprising:
   a housing; and
   an antenna, disposed in the housing and comprising:
      a ground element; a conductive element, which is L-shaped and connected to the ground element, wherein the conductive element comprises a first arm and a second arm, the first arm is connected to the ground element, and the second arm is connected to the first arm and extending in a first direction;
      a signal line, coupled to the conductive element;
      a first transmitting element, connected to the conductive element for transmitting a first signal; and
      a second transmitting element, connected to the conductive element for transmitting a second signal, wherein the first signal is a GSM900 signal, the second signal is a DCS1800 signal, and the second transmitting element is a fractal antenna connected to the second arm.

16. The notebook as claimed in claim 15, wherein the second transmitting element comprises a first slot extending in the first direction.

17. An antenna, comprising:
   a ground element;
   a conductive element, which is L-shaped and comprises a first arm and a second arm, wherein the first arm is connected to the ground element, and the second arm is connected to the first arm and extending in a first direction;
   a signal line, coupled to the conductive element;
   a first fractal transmitting element, connected to the second arm and substantially extending in a second direction for transmitting a first signal, wherein the second direction is opposite to the first direction; and
   a second fractal transmitting element, connected to the second arm and substantially extending in the first direction for transmitting a second signal.

18. The antenna as claimed in claim 17, wherein the first signal is a GSM900 signal and the second signal is a DCS1800 signal.

* * * * *